US012533292B2

(12) United States Patent

Zhang et al.

(10) Patent No.: US 12,533,292 B2

(45) Date of Patent: Jan. 27, 2026

(54) PHYSICAL THERAPY DEVICE FOR MUSCLE NERVE ENDINGS

(71) Applicant: Guangzhou New Design Biotechnology Co. Ltd., Guangdong (CN)

(72) Inventors: Shaowei Zhang, Guangdong (CN); Sile Zou, Guangdong (CN); Hongtai Lin, Guangdong (CN); Weijian Wu, Guangdong (CN)

(73) Assignee: Guangzhou New Design Biotechnology Co., Ltd., Guangzhou (CN)

( * ) Notice: Subject to any disclaimer, the term of this patent is extended or adjusted under 35 U.S.C. 154(b) by 154 days.

(21) Appl. No.: 18/504,167

(22) Filed: Nov. 8, 2023

(65) Prior Publication Data

US 2025/0143966 A1 May 8, 2025

(51) Int. Cl.
*A61H 39/04* (2006.01)

(52) U.S. Cl.
CPC ..... *A61H 39/04* (2013.01); *A61H 2201/0207* (2013.01)

(58) Field of Classification Search
CPC ........ A61H 39/39; A61H 39/02; A61H 39/04; A61H 39/06
See application file for complete search history.

(56) References Cited

U.S. PATENT DOCUMENTS

| | | | | |
|---|---|---|---|---|
| 4,479,495 A * | 10/1984 | Isaacson | ................ | A61H 39/04 D24/211 |
| 2013/0085551 A1* | 4/2013 | Bachinski | .......... | A61N 1/36034 607/59 |
| 2022/0296465 A1* | 9/2022 | Tsai | ....................... | A61H 39/00 |

* cited by examiner

*Primary Examiner* — Todd J Scherbel

(74) *Attorney, Agent, or Firm* — Rondaus PLLC; George Liu

(57) ABSTRACT

The application provides a physical therapy device for muscle nerve endings, which includes: a fixing belt and a physical therapy unit, the physical therapy unit includes a knob assembly and a functional pressing head, the knob assembly is disposed on the outer side of the fixing belt, the functional pressing head is disposed on the inner side of the fixing belt; the knob assembly includes a bottom shell, an internal thread support, an external thread support, an upper shell and a knob, the internal thread support is disposed in the bottom shell and may slide from top to bottom along the bottom shell, the bottom end of the internal thread support penetrates through the fixing belt downwards The physical therapy device for muscle nerve endings of the application may carry out physical therapy on arms or legs aiming at different pathologies so as to effectively improve the physical therapy effect.

9 Claims, 9 Drawing Sheets

PHYSICAL THERAPY DEVICE FOR MUSCLE NERVE ENDINGS

TECHNICAL FIELD

The application relates to the technical field of medical care instruments, in particular to a physical therapy device for muscle nerve endings.

BACKGROUND

In daily life, muscle fatigue or strain often occurs in arms and legs of a person. Existing products for relieving muscle fatigue are generally binding belts, and a convex soft hull is disposed on a belt body of the binding belt or on the inner side of the binding belt to press a position of arm or leg strain.

However, the binding belt of the above structure has an unsatisfactory effect of relieving fatigue, and cannot effectively perform physical therapy for various pathologies. In addition, when used aiming at arms or legs of different sizes, the binding belt of the above structure is tightened to enable the soft hull to press against the position of arm or leg strain for pressing, the adjusting range is limited within the length range that a velcro connected to two ends of the binding belt may be connected to, and therefore, use of the binding belt is limited to a certain degree.

SUMMARY

The application provides a physical therapy device for muscle nerve endings, which may press arms or legs aiming at different pathologies so as to effectively improve the physical therapy effect.

The technical solution adopted by the application is: a physical therapy device for muscle nerve endings includes a fixing belt and a physical therapy unit, the physical therapy unit includes a knob assembly and a functional pressing head, the knob assembly is disposed on the outer side of the fixing belt, the functional pressing head is disposed on the inner side of the fixing belt, and the functional pressing head is detachably connected with the knob assembly.

The knob assembly includes a bottom shell, an internal thread support, an external thread support, an upper shell and a knob, the bottom shell is disposed on the outer side of the fixing belt, the internal thread support is disposed in the bottom shell and may slide from top to bottom along the bottom shell, the bottom end of the internal thread support penetrates through the fixing belt downwards, the upper shell is disposed on the outer side of the bottom shell in a covering manner, the external thread support is disposed in the upper shell and is in threaded assembly with the internal thread support, the knob rotatably sleeves the outer side of the upper shell and is fixedly connected with the external thread support, and the functional pressing head is detachably disposed at the bottom of the internal thread support.

Furthermore, a connector is disposed on the inner side of the fixing belt, and detachably disposed at the bottom of the internal thread support, and the functional pressing head is detachably disposed at the bottom of the connector.

Furthermore, a bonding surface is disposed on the top surface of the functional pressing head, a bonding surface is disposed on the bottom surface of the connector, and the functional pressing head attaches to the connector.

Furthermore, a hook part is disposed on the top of the functional pressing head, and may buckle the functional pressing head on the outer side of the connector.

Furthermore, a magnet is embedded in the functional pressing head, the bottom surface of the functional pressing head is an arc-shaped convex surface, and a plurality of annular grooves are formed in the bottom surface of the functional pressing head from inside to outside.

Furthermore, the functional pressing head is made of an elastic material, a cavity is formed in the functional pressing head, the cavity is filled with one of essential oil, iodine or alcohol gel, a plurality of seepage holes are formed in the bottom surface of the functional pressing head, and the seepage holes communicate with the cavity.

Furthermore, a convex hull sunken towards the inside of the cavity is disposed in the middle of the bottom surface of the functional pressing head, and all the seepage holes are formed in the convex hull.

Furthermore, a heating layer is disposed in the functional pressing head.

Furthermore, a polymer gel layer is disposed in the functional pressing head.

Furthermore, a convex part is disposed on the bottom of the internal thread support, an accommodating groove is formed at the bottom of the external thread support, and the convex part is contained in the accommodating groove.

Compared with the relevant art, in the application, by rotating the knob, the functional pressing head is pushed to move up and down so as to get close to an area of action, so as to perform hot or cold compress to the area of action, or extrude liquid medicine on the surface of the area of action, so as to perform physical therapy on a pathological part.

The functional pressing head of the application is detachably disposed at the bottom of the knob assembly through the connector, a variety of functional pressing heads may be replaced according to actual situation of patients, so as to achieve the optimal physical therapy effect.

BRIEF DESCRIPTION OF THE DRAWINGS

The drawings are provided to provide a further understanding of the application and constitute a part of this specification, and together with the following specific implementation modes, serve to explain the application but do not constitute a limitation of the application. In the drawings.

DETAILED DESCRIPTION OF THE EMBODIMENTS

The specific implementation modes of the application will be described in detail below with reference to the drawings. It is to be understood that the specific implementation modes described herein are for the purpose of illustrating and explaining the application only and are not intended to limit the application.

Embodiment 1

Figure 1:
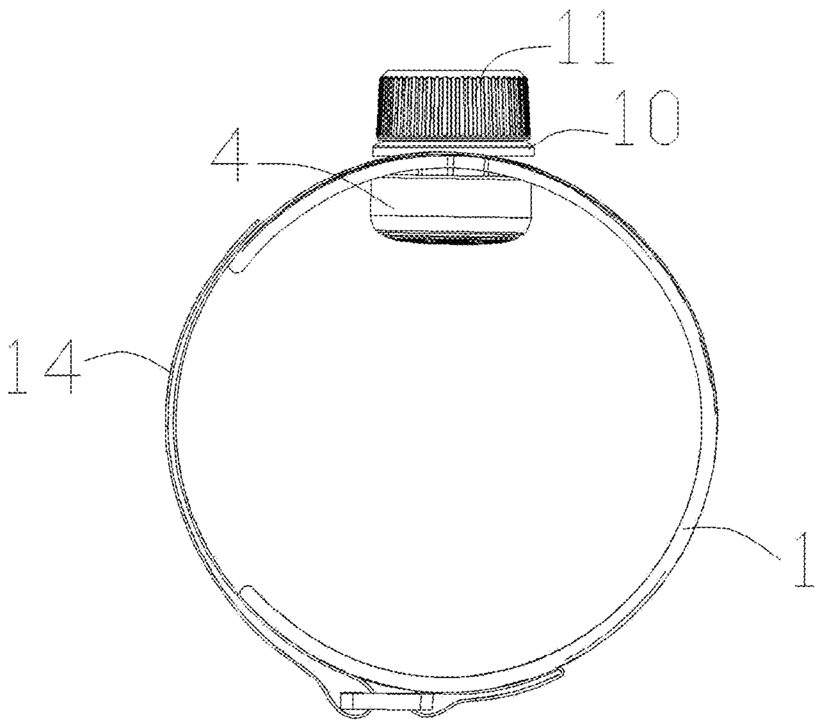
FIG. 1 is an assembly diagram of a three-dimensional view of Embodiment 1 of a physical therapy device for muscle nerve endings of the application.
Figure 2:
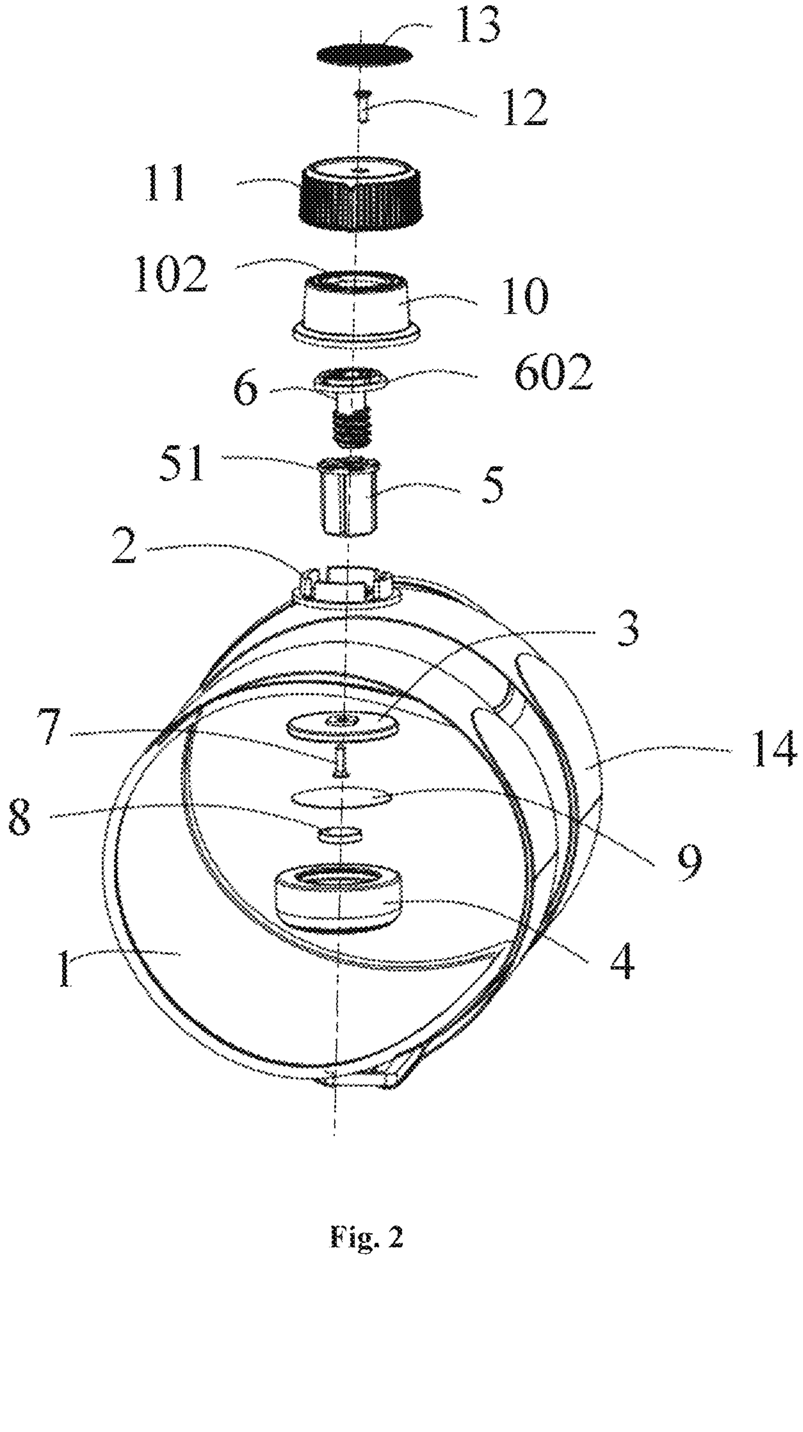
FIG. 2 is an exploded diagram of a three-dimensional view of Embodiment 1 of a physical therapy device for muscle nerve endings of the application.

As shown in FIGS. 1 and 2, a physical therapy device for muscle nerve endings of the application includes a fixing belt 1 and a physical therapy unit, the physical therapy unit includes a knob assembly and a functional pressing head 4, the knob assembly is disposed on the outer side of the fixing belt, the functional pressing head 4 is disposed on the inner side of the fixing belt 1, and the functional pressing head 4 is detachably connected with the knob assembly.

Specifically, the knob assembly includes a bottom shell 2, an internal thread support 5, an external thread support 6, an upper shell 10 and a knob 11, the bottom shell 2 is disposed on the outer side of the fixing belt 1 (the upper side in the drawing), the internal thread support 5 is disposed in the bottom shell 2 and may slide from top to bottom (cannot perform autorotation) along the bottom shell 2, the bottom end of the internal thread support 5 penetrates through the fixing belt 1 downwards, a through hole is formed in the bottom shell 2, a matched hole is correspondingly formed in the fixing belt 1 for communicating with the through hole, the upper shell 10 is disposed on the outer side of the bottom shell 2 in a covering manner, the external thread support 6 is disposed in the upper shell 10 and is in threaded assembly with the internal thread support 5, the knob 11 rotatably sleeves the outer side of the upper shell 10 and is fixedly connected with the external thread support 6, and the functional pressing head 4 is detachably disposed at the bottom of the external thread support 6.

A connector 3 is disposed on the inner side of the fixing belt 1, the connector 3 is detachably disposed at the bottom of the internal thread support 5, specifically, the connector 3 is fixedly connected at the bottom end of the internal thread support 5 through a bottom screw 7, the axial dimension of the connector 3 is greater than the diameter of the through hole of the bottom shell 2 for restricting the connector 3 from entering the through hole of the bottom shell 2, a circle of outer edge 51 is disposed on the periphery of the top end of the internal thread support 5, thereby restricting the internal thread support 5 from downwards passing through the through hole of the bottom shell 2, and the functional pressing head 4 is detachably disposed on the bottom of the connector 3.

Figure 3:
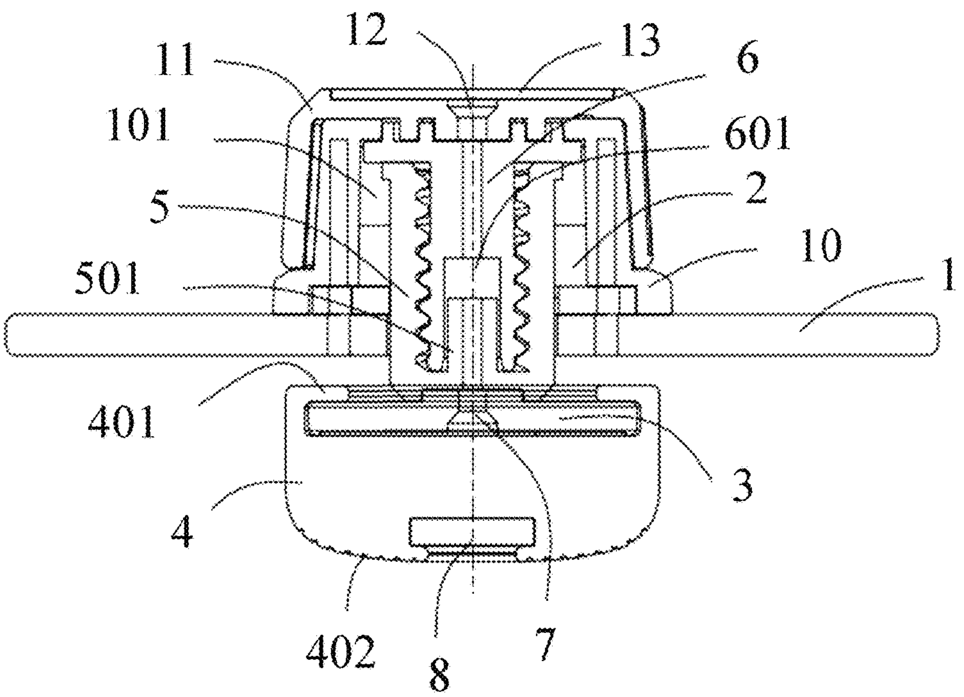
FIG. 3 is a diagram of a sectional view of Embodiment 1 of a physical therapy device for muscle nerve endings of the application.
Figure 4:
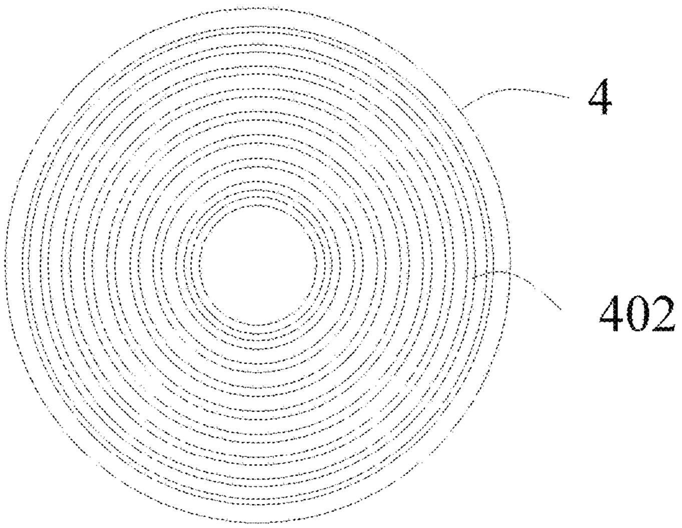
FIG. 4 is a diagram of a bottom view of Embodiment 1 of a functional pressing head of the application.

As shown in FIGS. 2-4, the internal thread support 5 and the outer thread support 6 are cylindrical. A threaded hole is formed in the top of the internal thread support 5, which is a threaded hole open at the top end and closed at the bottom end, a convex part 501 is disposed at the bottom in the threaded hole, and the threaded end of the bottom screw 7 is in threaded assembly with the convex part 501 after penetrating through the connector 3, so as to fixedly connect the connector 3 at the bottom end of the internal thread support 5. A thread matched with the threaded hole is formed in the outer side of the outer thread support 6, an accommodating groove 601 is formed on the bottom surface of the external thread support 6, the convex part 501 may be contained in the accommodating groove 601, meanwhile, a circle of outer periphery 602 is disposed on the outer side of the top of the external thread support 6 for restricting the external thread support 6 from upwards escaping from the upper shell 10.

The upper shell 10 is fixedly connected to the bottom shell 2, a containing cavity 101 is formed at the bottom end of the upper shell 10 for containing the internal thread support 5, a communication hole 102 is formed in the top of the upper shell 10, the communication hole 102 communicates with the containing cavity 101, the top end of the external thread support 6 may pass through the communication hole 102 to be connected with the knob 11, the diameter of the communication hole 102 is smaller than that of the outer periphery 602 at the top of the external thread support 6, so as to limit the external thread support 6 in the containing cavity 101.

The knob 11 sleeves the outer side of the upper shell 10, the knob 11 may rotate relative to the upper shell 10, the knob 11 is fixedly connected with the top end of the external thread support 6 through the top screw 12, and the knob 11 is adaptive to the external thread support 6 through a mortise and tenon structure, so that the external thread support 6 is driven to rotate by rotating the knob 11. It can be understood that a clamping block and a clamping groove are disposed on the surface, contacting the external thread support 6, of the knob 11, and the clamping block and the clamping groove may be matched with each other, which may improve the stability of fixed connection between the knob 11 and the external thread support 6.

In addition, a top decorating part 13 is mounted at the top of the knob 11 for covering an end cap of the top screw 12, which is both beautiful and prevents the top screw 12 from rusting.

Velcro hook and pull fastening straps 14 are disposed at two ends of the fixing belt 1, the fixing belt 1 is fixed to the arm or leg through the velcro hook and pull fastening straps 14, and the tightness of the fixing belt 1 at a binding position may be adjusted through the velcro hook and pull fastening straps 14.

The top end of the external thread support 6 is connected with the knob 11 on the outer side of the upper shell 10, so that the external thread support 6 cannot move up and down relative to the upper shell 10, the external thread support 6 is driven to rotate by rotating the knob 11, and then the internal thread support 5 is enabled to move downwards or upwards relative to the external thread support 6 (that is, towards the inner side or outer side of the fixing belt 1), thus driving the functional pressing head 4 to move downwards or upwards. For example, when the knob 11 is rotated clockwise, the convex part 501 of the internal thread support 5 slowly quits from the accommodating groove 601, driving the connector 3 to move towards the inner side of the fixing belt 1, further driving the functional pressing head 4 to move towards the inner side of the fixing belt 1; on the contrary, the knob 11 is rotated counterclockwise to enable the internal thread support 5 to move towards the outer side of the fixing belt 1 relative to the external thread support 6, and the convex part 501 slowly extends into the accommodating groove 601, thereby driving the connector 3 to move towards the outer side of the fixing belt 1, and further driving the functional pressing head 4 to move towards the outer side of the fixing belt 1; and thus the compression degree of the functional pressing head 4 is adjusted.

A hook part 401 is disposed on the top of the functional pressing head 4, and the hook part 401 may buckle the functional pressing head 4 on the outer side of the connector 3. The bottom surface of the functional pressing head 4 is an arc-shaped convex surface, so that the functional pressing head 4 may better attach to the contact area. In addition, a plurality of annular grooves 402 are formed in the bottom surface of the functional pressing head 4 from inside to outside, in the embodiment, the annular grooves 402 are a plurality of annular grooves concentrically arranged, so as to effectively improve the pressing effect of the functional pressing head 4.

A bottom decorating part 9 is further mounted on the connector 3 for covering an end cap of the bottom screw 7.

Preferably, the functional pressing head 4 is a silicone part, a TPU part or a rubber part, which has a certain elastic deformation force, and is not limited thereto.

Furthermore, a magnet 8 is embedded in the functional pressing head 4, so that the functional pressing head 4 has a magnet therapy effect.

Embodiment 2

Figure 5:
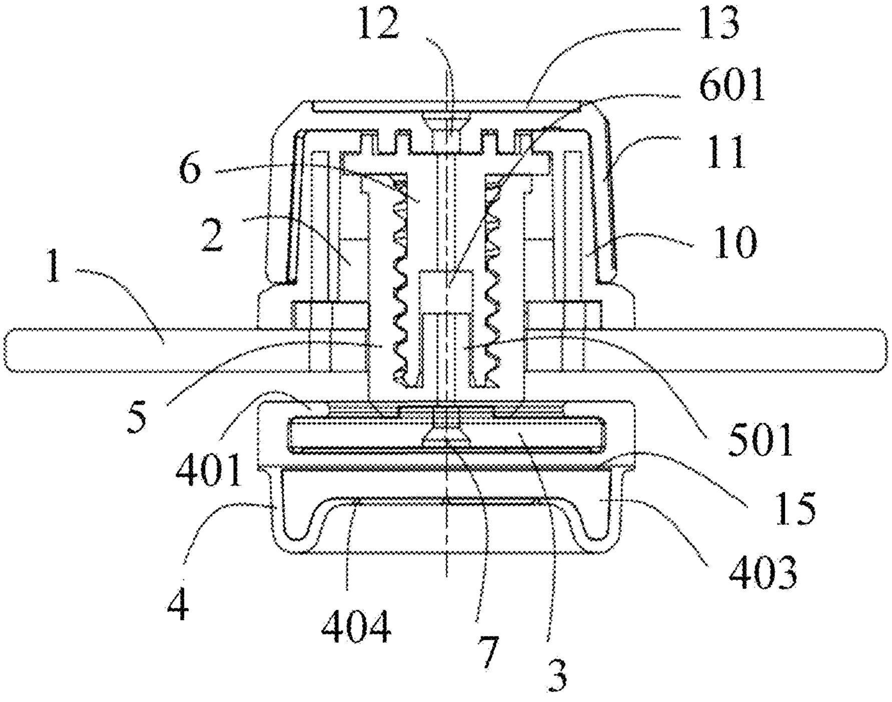
FIG. 5 is a diagram of a sectional view of Embodiment 2 of a physical therapy device for muscle nerve endings of the application.
Figure 6:
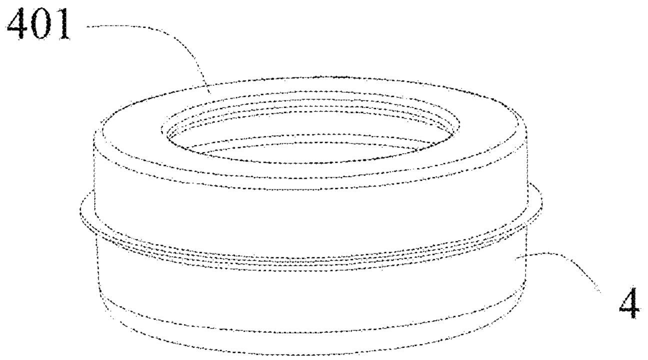
FIG. 6 is a diagram of a three-dimensional view of Embodiment 2 of a functional pressing head of the application.
Figure 7:
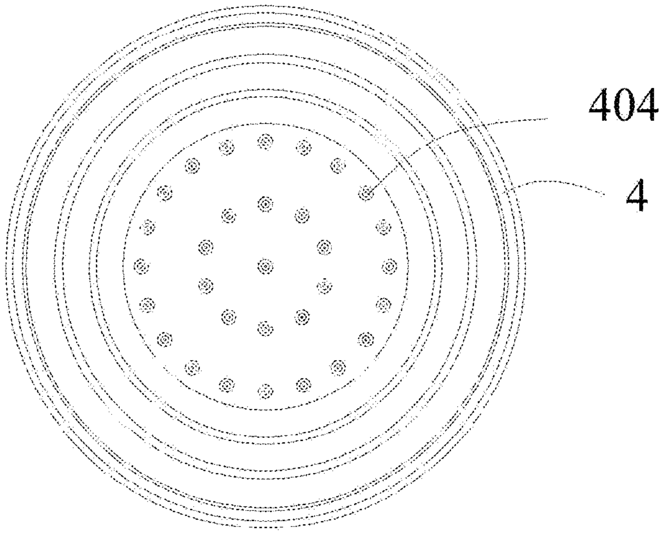
FIG. 7 is a diagram of a bottom view of Embodiment 2 of a functional pressing head of the application.

As shown in FIGS. 5-7, the same structure of the embodiment as Embodiment 1 will not be repeated here, but the differences are: in the embodiment, a cavity 403 is formed in the functional pressing head 4, the cavity 403 is filled with liquid medicine, which includes essential oil, iodine or alcohol gel, a top sealing plate 15 is disposed on the top surface of the functional pressing head 4, and the top sealing plate 15 seals the top surface of the cavity 403. In addition, a plurality of seepage holes 404 are formed in the bottom surface of the functional pressing head 4, and the seepage holes 404 communicate with the cavity 403.

The functional pressing head 4 is made of an elastic material, that is, the seepage hole 404 is an elastic hole, which is usually in a sealed state, the functional pressing head 4 opens after being pressed, so that the liquid medicine exudes from the cavity 403, furthermore, a convex hull sunken towards the inside of the cavity 403 is disposed in the middle of the bottom surface of the functional pressing head 4, and all the seepage holes 404 are formed in the convex hull, so that the liquid medicine may converge in the middle of the functional pressing head 4 (that is, the sinking position); or a sealing film is disposed in the seepage hole 404, a plurality of convex hulls aligned with the seepage holes 404 are disposed on the top surface of the cavity 403, when the functional pressing head 4 is pressed, the convex hulls are pressed into the corresponding seepage holes 404 for puncturing the sealing films at the seepage holes 404, and then seepage of the seepage holes 404 is realized.

Embodiment 3

Figure 8:
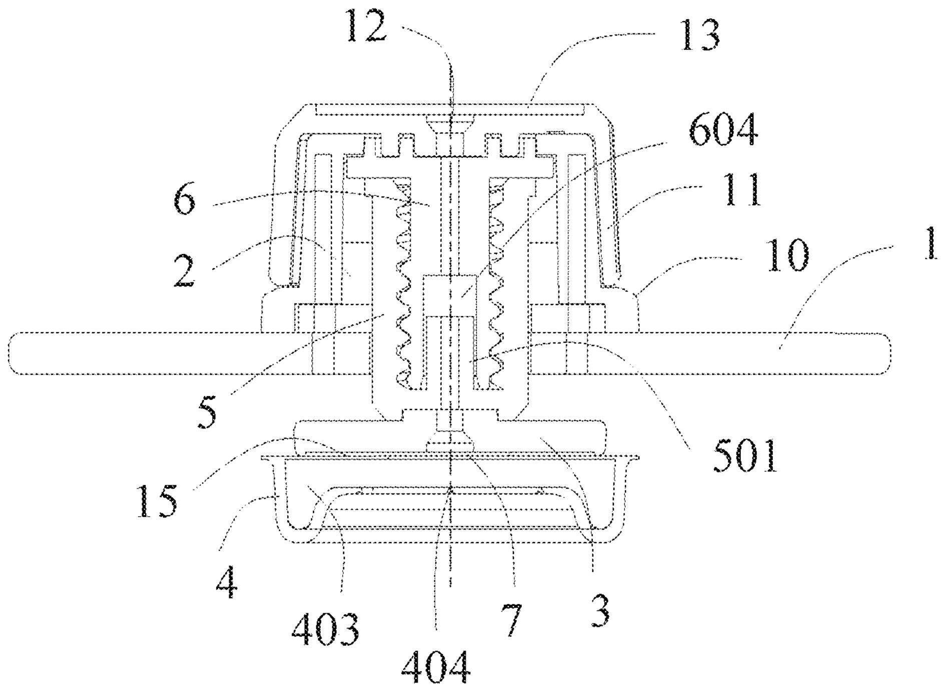
FIG. 8 is a diagram of a sectional view of Embodiment 3 of a physical therapy device for muscle nerve endings of the application.
Figure 9:
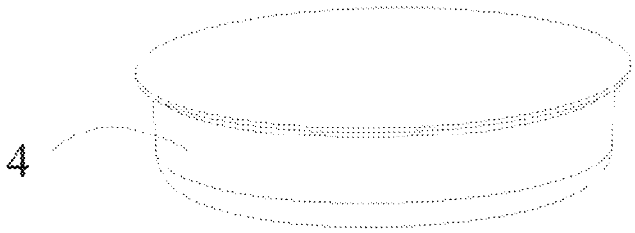
FIG. 9 is a diagram of a three-dimensional view of Embodiment 3 of a functional pressing head of the application.

As shown in FIGS. 8 and 9, the same structure of the embodiment as Embodiment 1 and Embodiment 2 will not be repeated here, but the differences are: in the embodiment, a hook part 401 is not disposed on the functional pressing head 4, the functional pressing head 4 of the embodiment directly attaches to a connector 3, for example, a bonding surface is disposed on the bottom surface of the connector 3, a bonding surface is disposed on the top surface of the functional pressing head 4, so that the functional pressing head 4 may be connected with or disconnected with the connector 3.

Embodiment 4

Figure 10:
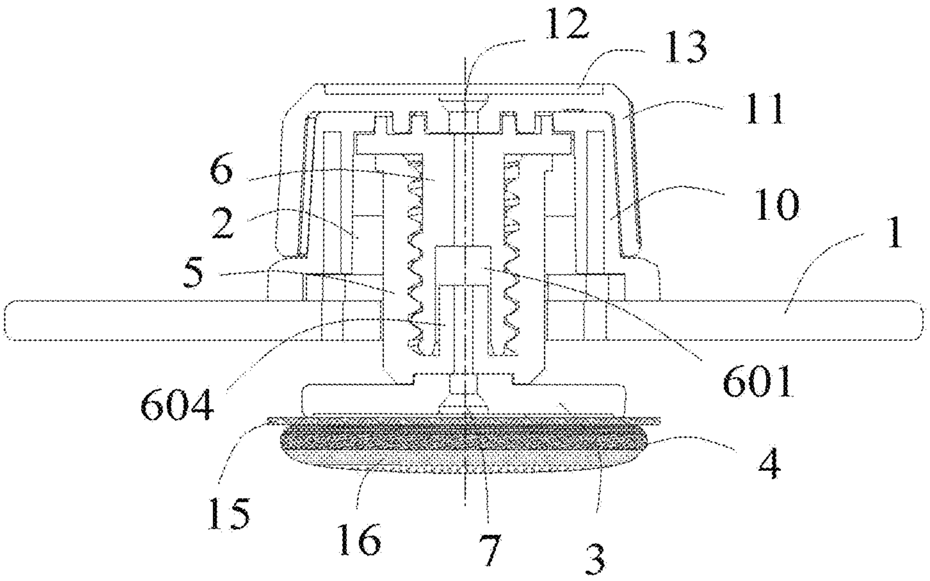
FIG. 10 is a diagram of a sectional view of Embodiment IV of a physical therapy device for muscle nerve endings of the application.
Figure 11:
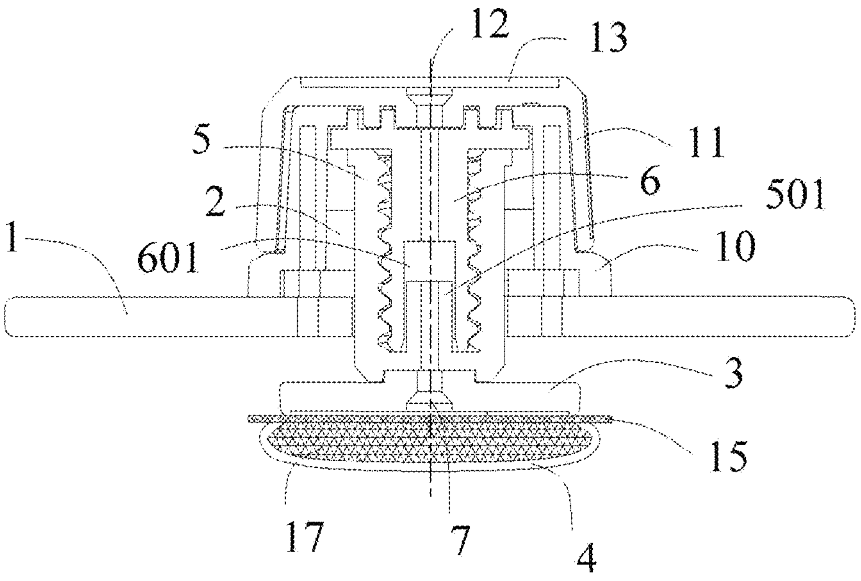
FIG. 11 is another diagram of a sectional view of Embodiment IV of a physical therapy device for muscle nerve endings of the application.
Figure 12:
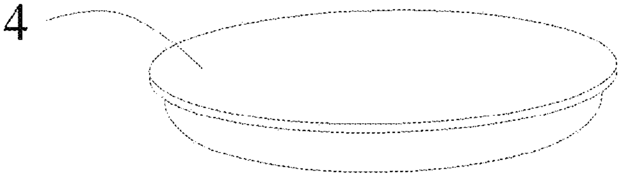
FIG. 12 is a diagram of a three-dimensional view of Embodiment IV of a functional pressing head of the application.

As shown in FIGS. 10-12, the same structure of the embodiment as Embodiment 1, Embodiment 2 and Embodiment 3 will not be repeated here, but the differences are: in the embodiment, a heating layer 16 or a polymer gel layer 17 is disposed in the functional pressing head 4; the functional pressing head 4 with the heating layer 16 is configured for hot compress, and the heating layer 16 may be a medical heating pack that heats when its opening is torn open available on the market. The functional pressing head 4 with the polymer gel layer 17 is configured for cold compress, for example, freezing liquid is adopted.

Embodiment 5

Figure 13:
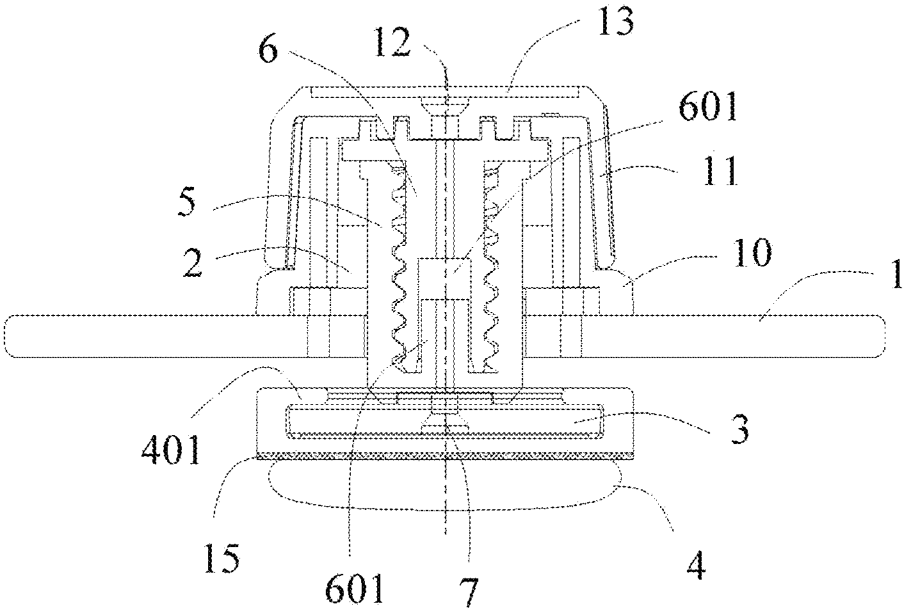
FIG. 13 is a diagram of a sectional view of Embodiment V of a physical therapy device for muscle nerve endings of the application.
Figure 14:
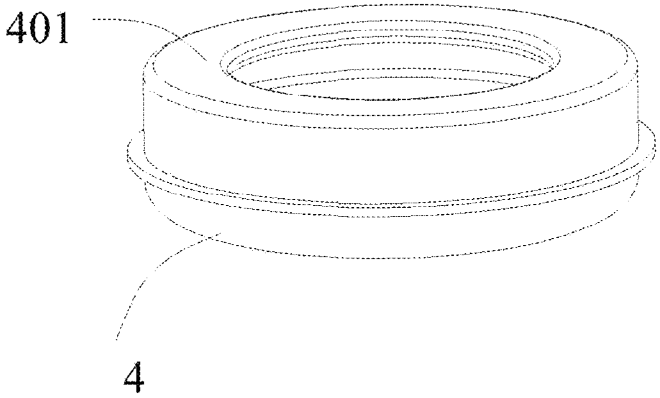
FIG. 14 is a diagram of a three-dimensional view of Embodiment V of a functional pressing head of the application.

As shown in FIGS. 13 and 14, the same structure of the embodiment as Embodiment 4 will not be repeated here, but the differences are: in the embodiment, a connecting part, namely, a hook part 401 is disposed on the top surface of the functional pressing head 4, the functional pressing head 4 is buckled to a connector 3 through the hook part 401, and a top sealing plate 15 on the top surface of the functional pressing head 4 is connected to the bottom surface of the hook part 401.

Any combination of various embodiments of the application shall be regarded as disclosed content of the application, without deviating from the idea of the application; within the scope of the technical conception of the application, a variety of simple variations of the technical solution and any combination of different embodiments that do not deviate from the idea of the application shall be within the scope of protection of the application.

What is claimed is:

1. A physical therapy device for muscle nerve endings, comprising a fixing belt and a physical therapy unit, the physical therapy unit comprises a knob assembly and a functional pressing head, the knob assembly is disposed on the outer side of the fixing belt, the functional pressing head is disposed on the inner side of the fixing belt, and the functional pressing head is detachably connected with the knob assembly;

the knob assembly comprises a bottom shell, an internal thread support, an external thread support, an upper shell and a knob, the bottom shell is disposed on the outer side of the fixing belt, the internal thread support is disposed in the bottom shell and may slide from top to bottom along the bottom shell, the bottom end of the internal thread support penetrates through the fixing belt downwards, the upper shell is disposed on the outer side of the bottom shell in a covering manner, the external thread support is disposed in the upper shell and is in threaded assembly with the internal thread support, the knob rotatably sleeves the outer side of the upper shell and is fixedly connected with the external thread support, and the functional pressing head is detachably disposed at the bottom of the internal thread support; wherein a connector is disposed on the inner side of the fixing belt, the connector is detachably disposed at the bottom of the internal thread support, and the functional pressing head is detachably disposed at the bottom of the connector.

2. The physical therapy device for muscle nerve endings according to claim 1, wherein a bonding surface is disposed on the top surface of the functional pressing head, a bonding surface is disposed on the bottom surface of the connector, and the functional pressing head attaches to the connector.

3. The physical therapy device for muscle nerve endings according to claim 1, wherein a hook part is disposed on the top of the functional pressing head, and the hook part may buckle the functional pressing head on the outer side of the connector.

4. The physical therapy device for muscle nerve endings according to claim 1, wherein a magnet is embedded in the functional pressing head, the bottom surface of the functional pressing head is an arc-shaped convex surface, and a plurality of annular grooves are formed in the bottom surface of the functional pressing head from inside to outside.

5. The physical therapy device for muscle nerve endings according to claim 1, wherein the functional pressing head is made of an elastic material, a cavity is formed in the functional pressing head, the cavity is filled with one of essential oil, iodine or alcohol gel, a plurality of seepage holes are formed in the bottom surface of the functional pressing head, and the seepage holes communicate with the cavity.

6. The physical therapy device for muscle nerve endings according to claim 5, wherein a convex hull sunken towards the inside of the cavity is disposed in the middle of the bottom surface of the functional pressing head, and all the seepage holes are formed in the convex hull.

7. The physical therapy device for muscle nerve endings according to claim 1, wherein a heating layer is disposed in the functional pressing head.

8. The physical therapy device for muscle nerve endings according to claim 1, wherein a polymer gel layer is disposed in the functional pressing head.

9. The physical therapy device for muscle nerve endings according to claim 1, wherein a convex part is disposed on the bottom of the internal thread support, an accommodating groove is formed at the bottom of the external thread support, and the convex part is contained in the accommodating groove.

* * * * *